April 18, 1967 E. D. HAIGLER 3,314,582
ULTRASONIC SCISSORS BONDING INSTRUMENT
Filed Feb. 21, 1964 4 Sheets-Sheet 3
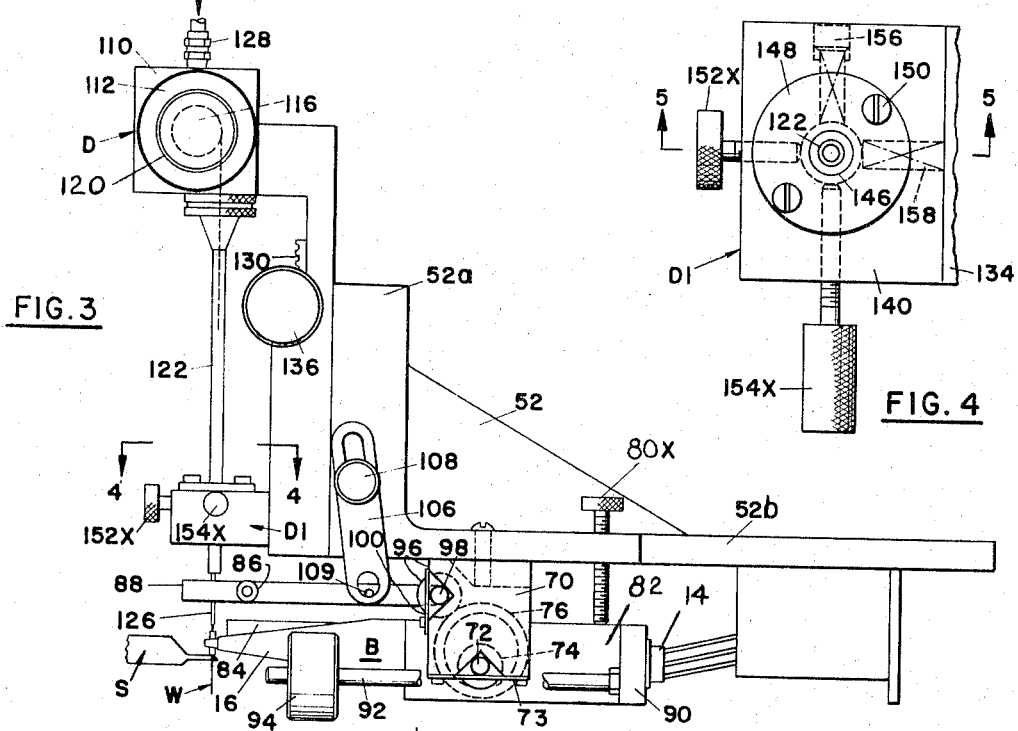
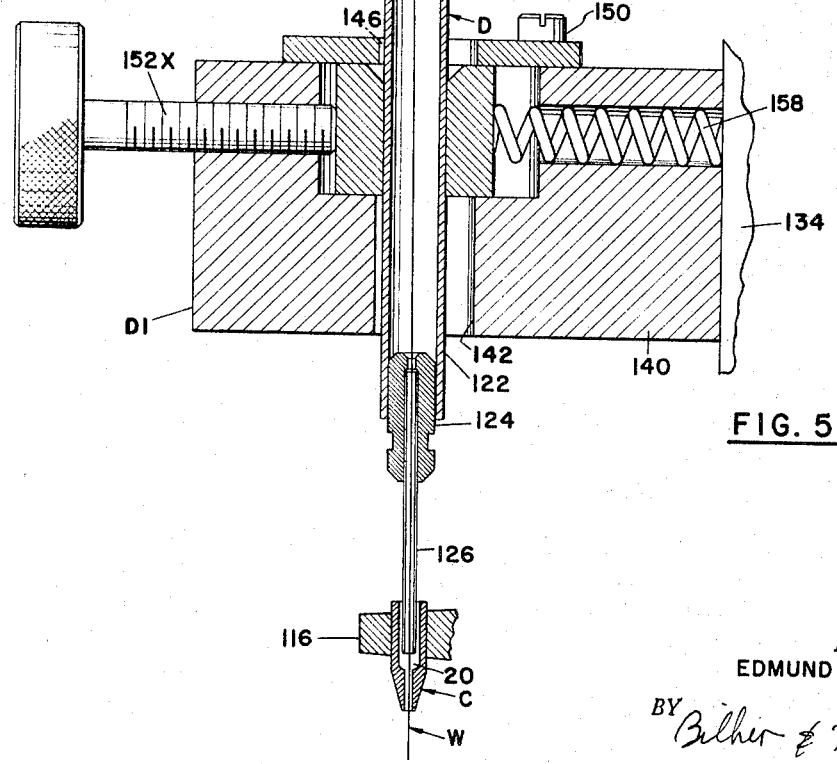
INVENTOR.
EDMUND D. HAIGLER
BY Bilker & Moyerman
ATTORNEYS April 18, 1967    E. D. HAIGLER    3,314,582
ULTRASONIC SCISSORS BONDING INSTRUMENT
Filed Feb. 21, 1964    4 Sheets-Sheet 4

INVENTOR.
EDMUND D. HAIGLER
BY
Bilker & Moyerman
ATTORNEYS

# United States Patent Office 3,314,582
Patented Apr. 18, 1967

3,314,582
ULTRASONIC SCISSORS BONDING INSTRUMENT
Edmund D. Haigler, Hatboro, Pa., assignor to Kulicke and Soffa Manufacturing Company, Fort Washington, Pa., a corporation of Pennsylvania
Filed Feb. 21, 1964, Ser. No. 346,567
12 Claims. (Cl. 228—1)

This invention relates to a bonding instrument for securing fine wire leads to semiconductor devices, and more particularly relates to a method and apparatus employing ultrasonic vibratory energy for bonding such lead wire.

In the usual electric or flame welding, the metal to be welded is actually melted by raising it to a temperature in which a molten state is reached and the metal oxides float away from the interface. Soldering or brazing may be utilized where the temperature of welding becomes prohibitive. Where the metal itself is too "dirty" to "wet" (as a result of its proclivity to form its natural oxides), it is usually necessary first to scrape or bare the surface by means of mechanical scratching or chemical fluxing whereby the oxide may float and allow the exposed metal to be bared.

In thermocompression bonding there is no molten or liquid phase, but, as with blacksmith's hammer welding, metal well below the melting point is deformed rapidly so as to break the oxide film and thereafter the oxide free surfaces are caused to be forcibly urged with great pressure into intimate contact and bond or weld to one another. However, with metals such as aluminum which are extremely active chemically and rapidly form very adherent oxides, especially at elevated temperatures, both electric spot welding or thermocompression bonding are most difficult unless the metal is well and freshly cleaned.

Ultrasonic welding is essentially a sophisticated "galling" procedure in which two surfaces are rubbed together so as to wear the oxide off the high points and produce localized welding of bare cold metal. Aluminum wire is pressed by a suitable tool against a surface with controlled force and brief but intense vibration at the interface. The surface oxides are scrubbed away, and the molecules of the two materials bond together. The vibration must be sufficient to clean away the film oxides but not so violent as to break the bonds as they form. The force must be sufficient to cause intimate contact, but not so great as to limit vibration.

In the ultrasonic welding process, alternating electric current or power is converted into a high frequency mechanical vibration. This vibration is delivered to the parts being welded in such a way that dynamic stresses are induced in a limited area near the interface between the work pieces. When these dynamic stresses reach sufficient intensity, they cause plastic deformation of the interface material so that adherent moisture, organic and oxide films are broken up and dispersed. In addition, the irregularity of the original interface surfaces are eliminated to create an area of intimate nascent metal contact. This action results in a true metallurgical bond formed in the solid state, with no melting of the materials being joined.

It is in regard to the ultrasonic bonding of extremely fine gauge lead wire (less than 0.010 inch diameter), especially aluminum, copper, silver, annealed gold, etc. wire, to semiconductor plated electrodes that the instant invention is concerned. In the case of semiconductor power rectifiers and transistors, which operate at high temperatures, it is particularly desirable to substitute aluminum lead wire for gold and yet avoid the formation of gold-aluminum intermetallics which are brittle and cause a trouble known as the "purple plague." In ultrasonic bonding no brazing, filler or soldering materials are required, nor is the use of any chemical flux necessary which, if used, could likely cause contamination of the semiconductor junction. Furthermore, expensive precleaning and postcleaning treatment of the parts is eliminated, and no outgassing or arcing is involved as is the case in ordinary welding. In addition, the slow, costly and frequently damaging preheating cycle of thermocompression bonding is removed.

However, ultrasonic bonding of extremely fine gauge wire presents a number of problems. If the application of the vibratory load is accomplished by a wedge-shaped bonding tool to which is applied the ultrasonic vibratory energy, there is a tendency to cold work the lead wire which results in a diminution in bond and/or wire strength. On the other hand where a grooved tool is utilized for constraining the wire to be bonded, the lead wire must be very accurately positioned and laid within the groove in order to yield consistent bonds.

It is therefore an object of this invention to provide an ultrasonic bonding instrument for securing a fine lead wire to semiconductive devices at high rates of production.

Another object of this invention is to provide an ultrasonic bonding instrument which will secure a lead wire to semiconductive devices with consistently high bond strengths.

Another object of this invention is to provide an ultrasonic bonding instrument wherein the bonding tool is grooved for receiving wire continuously dispensed from a spool and is coupled with a cut-off which snips the wire on demand and accurately lays a buttonhook or quadrant of the wire within the groove.

Still another object of this invention is to provide an ultrasonic bonding instrument with scissors cut-off which will permit the securing of extremely fine gauge aluminum wire (below 0.010 inch diameter) to be secured to semiconductive devices with out causing the formation of "purple plague."

A still further object of this invention is to provide an ultrasonic lead wire bonding instrument with scissors cut-off which will bond lead wire to semiconductive devices rapidly and at room temperatures and without the use of flux, fillers or solders.

Still a further object of this invention is to provide an ultrasonic bonding instrument with scissors cut-off which will secure lead wires of chemically active metals to semiconductive devices without contamination thereof.

Other objects of this invention are to provide an improved device of the character described which is easily and economically produced, that is sturdy in construction and highly effective and efficient in operation.

With the above and related objects in view, this invention consists of the details of construction and combination of parts as will be more fully understood from the following detailed description when read in conjunction with the accompanying drawing in which:

FIGURE 3 is a side elevational view of the bonding head.

FIGURE 4 is a sectional view taken along lines 4—4 of FIGURE 3.

FIGURE 5 is a sectional view taken along lines 5—5 of FIGURE 4.

Figure 1:
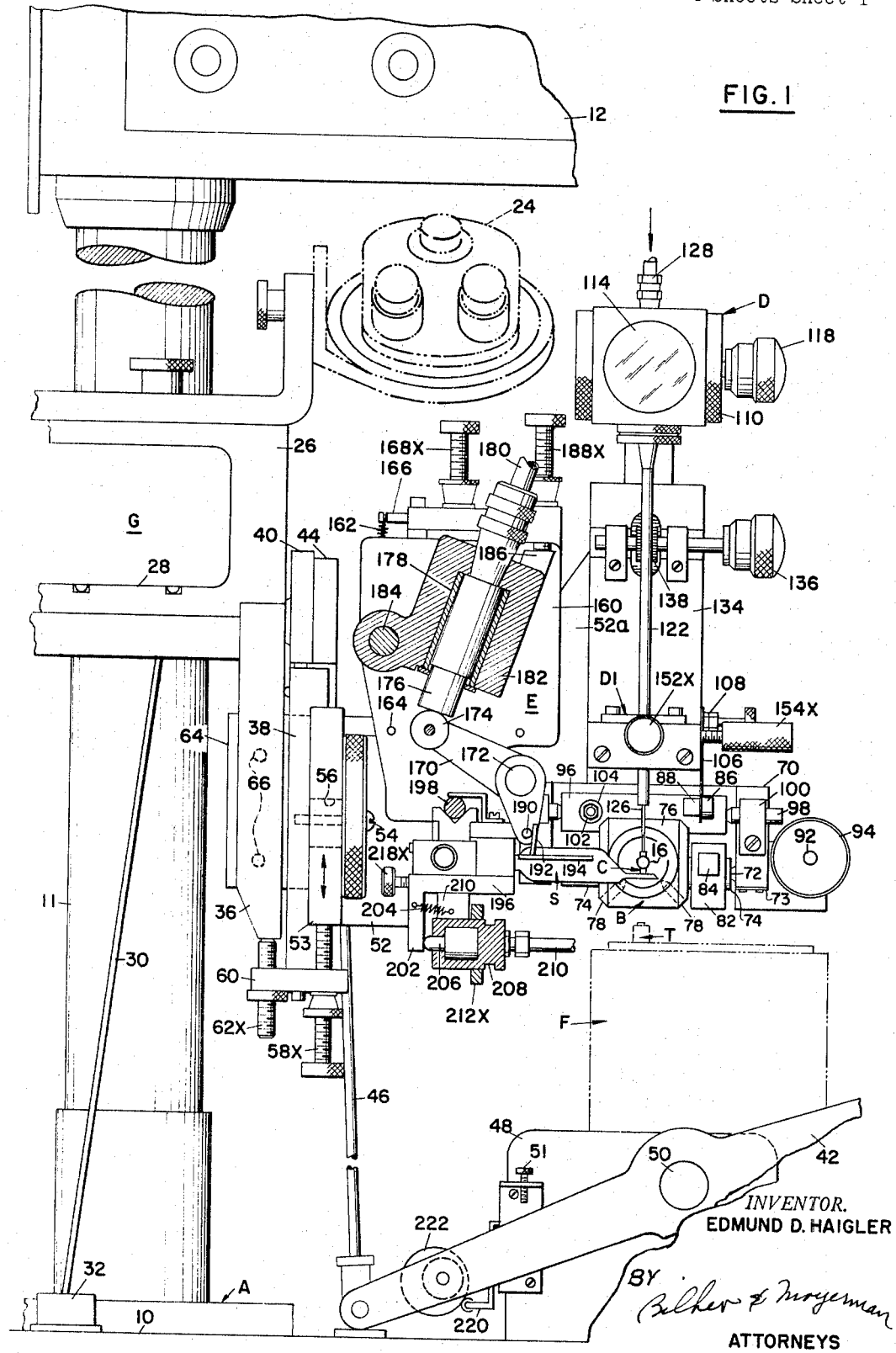
FIGURE 1 is a front elevational view of an ultrasonic scissors cut-off wire bonding instrument embodied in this invention.

Referring now in greater detail to the drawings in which similar reference characters refer to similar parts, the ultrasonic scissors bonder of the instant invention comprises a frame, generally designated as A, a vertically-reciprocable ultrasonic bonding head B pivotally supported in the frame, a capillary bonding tool C detachably secured within the bonding head, a wire feeding assembly D for continuously dispensing wire from a spool to the tool C, a scissors cut-off assembly E for snipping the wire and accurately laying a short L-shaped hook of wire within a groove at the tip thereof, a stage F for supporting semiconductive devices in position for lead bonding, and a manipulator G for horizontally orienting and then depressing the bonding lead into engagement with the appropriate area of the semiconductor T to which the lead wire is to be secured.

Figure 7:
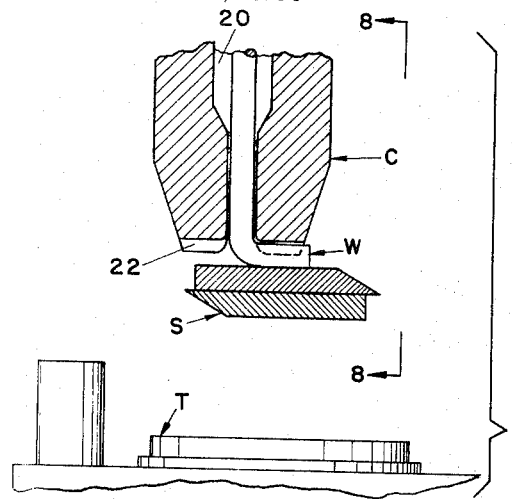
FIGURE 7 is a sectional view taken along lines 7—7 of FIGURE 6.
Figure 8:
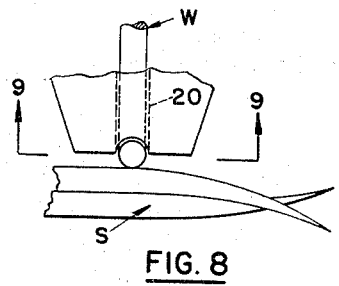
FIGURE 8 is a sectional view taken along lines 8—8 of FIGURE 7.
Figure 9:
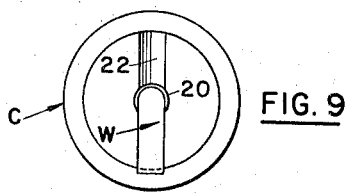
FIGURE 9 is a sectional view taken along lines 9—9 of FIGURE 8.

The bonding head B comprises a magnetostrictive transducer element which converts an alternating electric power input into a high frequency mechanical vibration, such as a model W-260-TSL welder unit, made by the Sonoweld Corporation subsidiary of Aero Projects, Inc., of West Chester, Pa., and generally described in U.S. Patent No. 2,946,119 and No. 2,946,120. The cylindrical portion of the welding transducer B includes within its interior a laminated nickel stack wound with an R-F excitation coil (not shown) which communicates with a 60 kilocycle generator power source located within control module 12. Upon variation of the magnetic field strength of the excitation coil, there will be produced concomitant variations in the dimensions of the transducer portion 14 resulting in vibrations which are transmitted through a resonant system terminating in a longitudinally tapered metal coupling member 16. The end of the member is split for receiving the capillary bonding tool C which is retained firmly in position therein by clamping screw 18 so that the capillary itself is retained essentially vertically and transversely to the axis of the tapered member 16. The bonding tool C itself is a tungsten carbide capillary tube, for example, having a bore 20 somewhat larger than the diameter of the wire W to be used. Although the capillary may be used as a wedge bonding tool without the use of a groove at the lower end, it is preferable that a groove 22, as shown in FIGS. 7, 8 and 9, be formed at the capillary tip transverse to the bore thereof. The groove length is approximately one to three wire diameters and having a width approximating one wire diameter and a semicircular depth of one-half a wire diameter. Thus the groove 22 tends to control and constrain the wire therein and prevents sliding or rolling thereof as would occur with an ungrooved capillary.

The instant invention is directed to the use of a vertically-reciprocable capillary bonding tool C to which wire W is continuously dispensed from the wire feeder D. Cut-off is performed instantaneously by the cut-off assembly E having a scissors S which is oriented perpendicular to the wire axis immediately below the capillary tip C. When the lead wire W is snipped, the upper blade of the scissors carries along a small length of the downwardly depending wire and bends it in the form of an L-shaped hook under the capillary tip, as shown in FIGS. 7, 8, 9 and 11. The general method of scissors forming the L-shaped wire hook under the capillary tip is fully described and set forth in U.S. Patent application, Ser. No. 291,457, filed June 28, 1963, for an invention in Thermocompression Wire Bonding Apparatus With Scissors Cut-off, by Pavels Rasimenoks et al. The capillary C with its depending L-shaped wire hook is then depressed between the scissors blades (FIG. 11) into contact with an electrode on the semiconductor surface T at a preset force or pressure resulting from the upward pivotal motion of the bonding head B itself. The operator then depresses a foot switch (not shown), which closes the circuit and causes the transducer to be urged into longitudinal vibration for a predetermined length of time, as set by the controls on the module 12. This causes vibration transverse to the work of the capillary tool C carrying the buttonhook of wire W contained within the groove at its tip. The tip of the capillary tool C vibrates through a very small amplitude thereby scrubbing the wire W against the surface of the transistor. This removes the oxide film from both the semiconductor surface and the wire itself and effects an ultrasonic bond of the wire by galling it against the semiconductor surface T. Elevating the vertically-reciprocable plate of the manipulator G raises capillary tip C upwardly on the now depending wire "column" W. The length of wire between the bonding tip C and the end already bonded to the semiconductor T is sufficient to permit this lead to be coupled to the post of the semiconductor without undue strain.

The manipulator G is now horizontally repositioned so as to orient the capillary C over the post of the transistor preparatory to forming a minimum loop connecting of wire from the first bond to the second bond at the post. The capillary C is again depressed so as to enable an ultrasonic bond to be repeated at the transistor post. Now elevating the vertically-reciprocable plate of the manipulator G, raises the capillary tip from a position between the vertically fixed scissors S to a height immediately above the blades thereof. The scissors blades are now actuated by a second foot switch (not shown) which causes the scissors element to snip the wire W immediately below the bonding tool C, and the upper blade of the scissors tucks the severed depending end of the wire into the form of an L-shaped hook in the groove 22 under the capillary tip. The scissors S is then pivoted a few thousandths below the L-shaped hook so as to prevent reverse wiping action of the scissors from disturbing wire alignment in the groove 22. The instrument is now ready for the next sequence of lead bonding operations.

The frame A includes a base of tabletop 10 having a column 11 upwardly extending therefrom and supporting the console module 12 which contains the various electrical and gas control components. The manipulator G upon which the bonding head B and the cut-off assembly E is secured is adjustably affixed to the column 11 by suitable brackets (not shown). A stereo microscope 34 is mounted upon the manipulator G and is movable therewith so that the operator may constantly observe under three-dimensional magnification the position of the bonding capillary C with respect to the exact location on the semiconductor T to which the lead wire is to be bonded.

The manipulator G comprises a micropositioning assembly substantially the same as that fully shown and described in U.S. Patent No. 3,149,510, for an invention by Frederick W. Kulicke, Jr., in Fine Wire Manipulator and Bonding Instrument for Transistors. Briefly, and as generally illustrated in FIG. 1, the manipulator G includes an outer shell member 26 which is horizontally slidable with respect to a fixed base stage 28. A downwardly depending rod 30 is universally coupled to the base stage 28 and the outer shell member 26, the lower end of the rod 30 being received within a universal joint in a fingerpiece 32 which is slidable on the tabletop 10. Horizontal movement of the "chessman" fingerpiece 32 on the table surface 10 transmits a proportionally reduced inverse movement along X- and Y-axes to the outer shell 26. That is, movement of the fingerpiece 32 in one direction causes the shell 26 to move in the opposite direction in order to compensate for the microscope inversion effect. A positioning limit stop 34 (not shown) is incorporated on the manipulator G to restrict the movement of the shell 28 in the right hand direction, as shown in FIG. 1, so as to prevent accidental collision of a delicate scissors E or capillary C with the stage F.

Affixed to the shell member 26 and downwardly depending therefrom is a vertical guideway 36 which slidably supports a vertically slidable plate 38 on the face thereof. Springs (not shown) urge the slider plate 38 upwardly against a cam 40 rotatably supported in the manipulator base stage 28. The cam 40 is coupled to an actuating lever 42 through crank 44 and connecting rod 46. The lever 42 is a Z-axis actuating lever which is pivotally supported in frame pedestal 48 upon shaft or trunnion 50. Depressing the right hand portion of the lever 42 manually causes the Z-axis slider plate 38 to be urged downwardly as a result of rotation of cam 40. Adjustable stop screw 51 acts as a bottoming post for clockwise rotation of the Z-actuating lever 42 and so defines a lower limit for the position of the Z-slider plate 38.

The bonding head B includes a main support casting 52 which is secured by a cap screw 54 to the face of the vertically slidable plate 38 and is reciprocable therewith. As shown in FIG. 1, the cap screw 54 extends through an elongated slot 56 in flange portion 53 of main support casting 52. Vertical adjustment of the casting 52 on the slider 38 is accomplished by thumb screw 58X which is threaded within block 58 affixed to the bottom edge of the slider 38. The upper limit of vertical reciprocable movement of the slider 38 is determined by adjusting screw 62X which is also threaded in the block 60 and abuts against the lower edge of the guideway 36. On the other hand, the cut-off assembly E is secured to the vertical guideway 36 of the manipulator G. Thus, while both the bonding head B and the cut-off assembly E are simultaneously positionable in a horizontal plane with respect to the semiconductor device T, it is only the bonding head B which is vertically reciprocable. The cut-off assembly E includes a mounting casting 64 which is rigidly secured by socket head screws 66 to the rear edge of the guideway plate 36. Thus, the adjusting screws 58X and 62X establish an upper reference level and assist in setting the vertical relationship between the scissors element S and the bonding capillary C so that the blades of the scissors can repeatedly be accurately positioned with respect to the capillary during cut-off.

Figure 2:
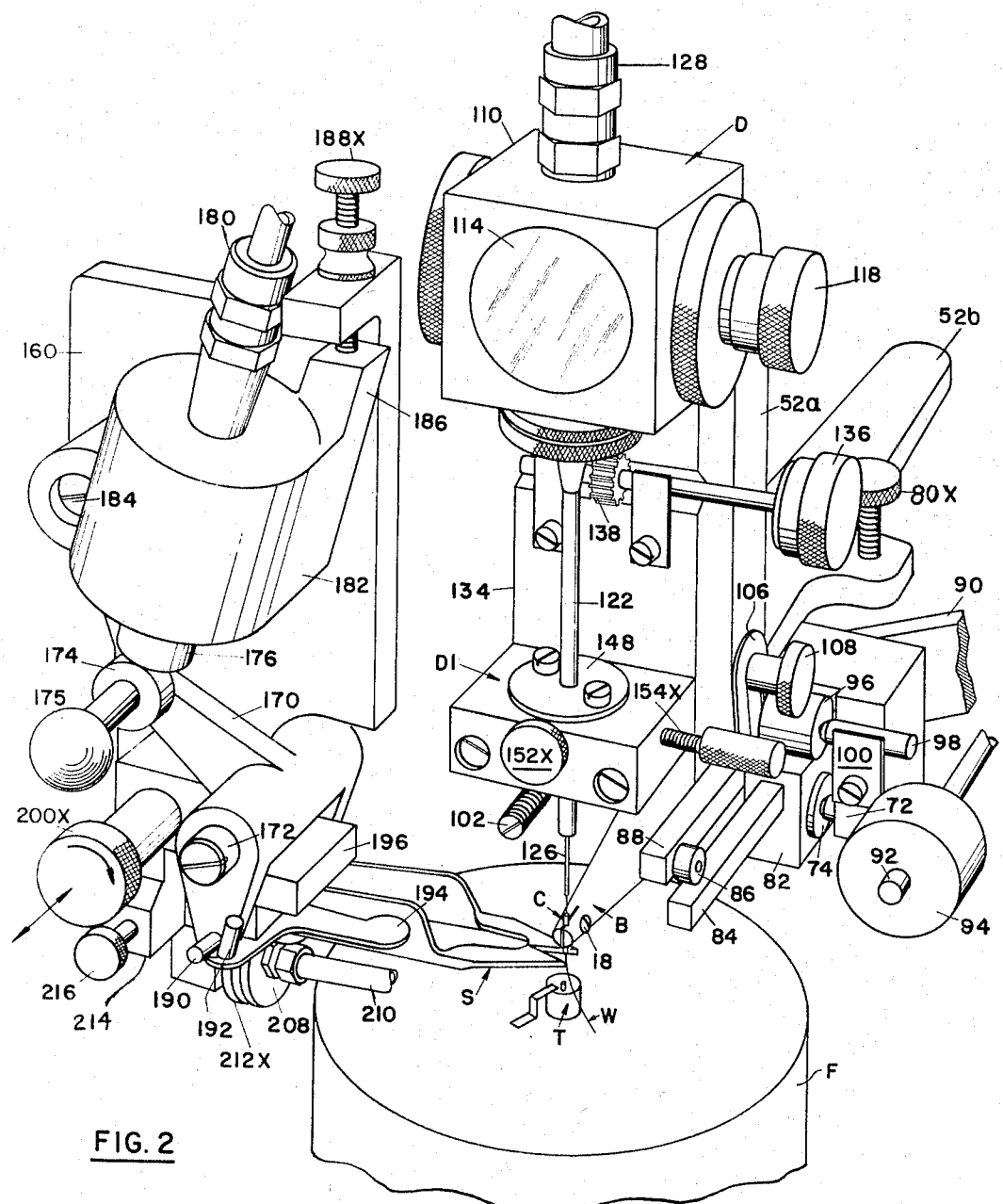
FIGURE 2 is an enlarged perspective view of the bonding head and scissors cut-off assemblies.

Referring to FIGS. 2 and 3, the main support casting 52 is cantilevered outwardly from the slider 38 and forms a boss portion 52a, upon which the wire dispenser D is mounted, and a tail portion 52b, to the lower surface of which is secured an inverted U-shaped bridge 70. Opposing conically pointed bearings 72 are adjustably secured by clamps 73 within inverted V-shaped notches in the bottom of each leg of the bridge 70. The spaced points of the bearings 72 pivotally journal trunnions 74 which outwardly extend from transducer yoke 76. The transducer head 14 is itself supported within a circular aperture in the yoke 76 by set screws 78. Level adjusting screw 80X is threaded within the tail 52b and abuts against the rearward portion of a block 82 attached to the transducer head 14 to limit the counterclockwise rotation thereof, as shown in FIG. 3.

Circumferentially embracing the right hand trunnion 74, as shown in FIGS. 1 and 2, is a block 82 from which forwardly extends an anvil arm 84. The anvil 84 is adapted to abut the roller 86 of hingedly supported hammer 88 when the bonding head B is pivoted beyond a predetermined angle. A bracket 90 is secured to the rear of the block 82 and laterally extends therefrom. A threaded rod 92 forwardly projects from the bracket 90 and has a counterweight 94 threaded thereon for adjustably varying the load to be applied to the wire W during bonding when the bonding head B is pivoted off from its stop screw 80X.

The hammer 88 is itself affixed to pivot shaft 96 and projects forwardly therefrom. The shaft 96 is also rotatably supported at its ends between cone points 98 which are retained by clamps 100 in V-notches within the medial portion of the legs of the bridge 70. Also forwardly projecting from the pivot shaft 96 is a threaded hammer loading rod 102 upon which suitable weights 104 may be mounted for applying a greater load upon the bonding head B when the anvil 84 is pivoted beyond a predetermined angle. This additional load is particularly desirable during bonding of the wire W to a post of the transistor T. The clockwise rotation of the hammer 88, as shown in FIG. 3, is limited by a hanger element 106 which is adjustably positioned on the boss 52a by a thumb screw 108. The lower end of the hanger 106 has an opening the lower periphery of which engages a pin 109 outwardly projecting from the hammer 88.

The wire dispensing assembly D is substantially identical to that fully shown and described in U.S. Patent No. 3,250,452, for an invention by Thomas L. Angelucci and Frederick W. Kulicke, Jr., entitled "Nail Head Bonding Apparatus for Thermocompressively Securing Lead Wire to Semiconductor Devices." It comprises a generally rectangular housing 110 having centrally disposed chamber 112 therein. The face of the housing 110 has a transparent plate 114 secured thereto so that wire loading, threading, and unspooling operation will be clearly visible to the operator. A mandrel 116 is rotatably supported within the chamber 112 and is adapted to be turned in either direction by a knurled knob 118. A spool 120, upon which the fine wire W is wound, is mounted upon the mandrel 116 so that the wire may be dispensed through feed tube 122 threaded into the lower portion of the housing 110 and downwardly extending therefrom. The upper portion of the feed tube has a conically-flared orifice (not shown) which acts as an entrance funnel to facilitate threading of the wire W into the bore of the feed tube 122. The lower end of the feed tube 122 has an insert 124 pushed therein and from which downwardly projects a hypodermic needle 126. The hypodermic needle freely interfits within the upper portion of the bore of the capillary C and facilitates threading thereof. A clean gas, such as filtered air or bottled nitrogen, is introduced into the chamber 112 through a fitting 128 mounted upon the top of the housing 110 in order to assist wire loading operations and to prevent contamination of the wire W after the spool 120 has been mounted upon the mandrel 116. A rack member 130 downwardly extends from the housing 110 and is slidably received within a vertically-disposed slot 132 in casing 134. The casing 134 is secured to the boss 52a of the main support casting 52. Vertical orientation of the feed tube 122 with respect to the capillary C is accomplished by suitable rotation of knob 136. The knob 136 has a shaft which is horizontally journalled within the casing 134 and has a pinion gear 138 affixed thereto for engaging the teeth of the rack member 130. It is only when it is desired to load the capillary C that the feed tube is lowered by the knob 136 for insertion within the capillary bore.

Because of the small diameter of the bore of the capillary C, a centering head D1 is provided to horizontally orient the flexible feed tube 122 so that it can be inserted within the enlarged upper portion of the bore 22 and feed the wire W through the restricted lower nozzle portion of said bore. The centering head D1 comprises a housing member 140 which is secured to the face of the dispenser casing 134. See FIGS. 3, 4 and 5. The housing member 140 has a longitudinal opening 142 somewhat larger than the outer diameter of the feed tube 122 and a counterbore 144 in which a collar 146 embracing the feed tube is slidably received. A cover plate 148 is secured to the top of the housing by screws 150 for retaining the collar 146 in place. Horizontal alignment screws 152X and 154X are threaded in the housing 140 and bear against the collar 146 in opposed disposition to springs 156 and 158. It is thus easily seen how the hypodermic needle 126 at the end of feed tube 122 may be oriented into registration with the capillary bore whereby the wire W can be urged through the lower bore portion whose diameter is approximately 1½ times that of the wire itself. See FIG. 5.

The cut-off assembly E, as has been previously set forth, is secured by casting 64 to the vertical guideway 36 of the manipulator G. Thus, while both the bonding head B and the cut-off assembly E are simultaneously oriented in a horizontal plane with respect to the semiconductor device T, it is only the bonding head B, since it is secured to the vertical slider 38, which is vertically reciprocable. The casting 64 has a vertically disposed keyway 64a which is adapted to slidably receive bracket 160 having a complementary guide key (not shown) in the back face thereof. See FIGS. 1 and 2. Vertically disposed coil springs 162 tensioned between hangers 164 in the bracket and pins 166 on the casting 64 bias the entire cut-off assembly E upwardly against vertical adjustment screw 168X.

A bell crank 170 is pivotally supported upon shaft 172 in the bracket 160. The upper arm of the bell crank 170 has a roller 174 which bears against the head of piston 176 which is reciprocable in air cylinder 178. The air cylinder 178 communicates through fitting 180 with a source of air under pressure actuated by a foot switch (not shown), and is mounted in yoke 182 hingedly supported on pivot shaft 184 horizontally extending from the bracket 160. A concealed spring (not shown) biases stub 186 integrally formed on the yoke 182 against adjusting screw 188X. The resilience of the scissors S, which is in the shape of a tweezers, biases the roller 174 against the head of piston 176. Thus, adjusting screw 188X determines the degree of scissors closure.

The lower end of the bell crank 170 is bifurcated and has a pair of camming rods 190 which outwardly extend from the legs thereof and bear against upstanding pins 192 on L-shaped actuating fingers 194. The actuating fingers 194 are hingedly supported upon respective vertically oriented spindles (not shown) which downwardly depend from scissors cradle block 196. The opposing tips on the actuating fingers are adapted to engage the sides of the scissors S and effect closure thereof when the air cylinder 178 is acuated so as to drive its piston 176 downwardly against the upper arm of the bell crank 170.

The cradle 196 is pivotally supported on shaft 198 horizontally supported in the bracket 160. An internal spring (not shown) biases the cradle 196 longitudinally outward against adjusting knob 200X whereby the centerline of the scissors S may be laterally positioned with respect to the axis of the capillary C. See FIG. 2. A toe 202 downwardly projects from the cradle 196 and is urged by spring 204 into abutment with piston 206 reciprocable in air cylinder 208 which communicates through tubing 210 to a source of air under pressure. The air cylinder 208 is threaded along its outer diameter and is mounted within a complementary threaded hole in leg member 210 downwardly projecting from the bracket 160. Horizontal adjustment of the air cylinder 208 is accomplished by screwing it along its own axis and thereafter locking knurled nut 212X. Thus, rotational adjustment of the cradle 196 about the shaft 198 is conveniently performed by turning the cylinder 208 in the appropriate direction so as to orient the plane of the scissors blades perpendicular to and immediately below the tip of the capillary C. Actuation of the air cylinder 208 is effected by a timed valve (not shown) which is energized immediately before the air cylinder 178 is de-activated and released. Pressurizing the air cylinder 208 causes the piston 206 to be urged from right to left, a few thousandths of an inch, as shown in FIGS. 1, 2, 6 and 7, whereby the cradle 196, and hence the scissors S, will be pivoted clockwise after the scissors have fully closed and before they reopen. This depressing action prevents the scissors blades, which have just formed an L-shaped hook in the wire W under the capillary tip, from reverse wiping against the L-shaped wire hook and avoids the frictional withdrawal of the wire from its accurately placed position within the capillary groove 22.

The scissors S is detachably received within a mounting block 214 and retained therein by clamping screw 216 which bears against the bight of the tweezers element. The mounting block 214 itself is horizontally slidable within the cradle 196 and is spring loaded from right to left against adjusting screw 218X which controls the disposition of the scissors along its own axis with respect to the capillary C.

Figure 6:
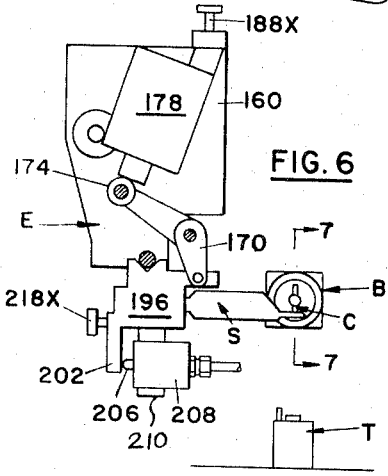
FIGURE 6 is a fragmentary front elevational view showing the scissors in cut-off position.
Figure 10:
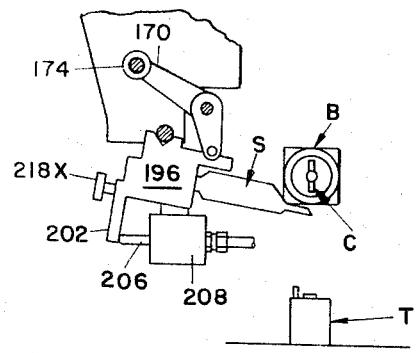
FIGURE 10 is a fragmentary front elevational view showing the slightly depressed position of the scissors after cut-off.

The scissors S, as has been said before, is an integrally formed tweezers element comprising a pair of spring sides which extend from a flat bight portion. Tines project from the supported portion of the sides and have respective blades, triangular in plan-configuration, which are welded thereto in adjacent planes perpendicular to the bight. The blades of the scissors S are resiliently urged apart by the spring sides which themselves bear against the tips actuating fingers 194 when the adjusting screw 188X is properly oriented. The thickness of each blade is approximately .002", and these must be delicately oriented with respect to the capillary tip C in order to effect the cutting of the wire W from the L-shaped hook at the severed end of the wire, and laying the formed hook accurately within the groove 22. That is, the capillary tip C must freely pass between the blades of the scissors S when they are open. In addition, when the blades are closed to sever the wire below the capillary tip, the upper blade must tuck the downwardly depending end of the severed wire W in the form of a buttonhook or "L" under the capillary tip. The top surface of the upper blade, in scissors cut-off position, is so oriented as to be spaced with minimum working clearance immediately below the capillary tip C by a distance slightly less than half the diameter of the wire W being used for making leads. Shearing of the wire occurs at the interface between the upper and lower scissors blades. However, since the thickness of each blade is .002", the upper blade of the scissors carries along a .002" increment of wire depending from the capillary. As the upper and lower blades overlap, the upper blade forces this small increment protruding from the capillary bore against the periphery thereof. Further traversing of the upper blade then bends and wedges the protruding wire end between the blade upper surface and the tip of the capillary where it is formed as a small hook. Since the groove 22 at the tip of the capillary is oriented perpendicular to the cutting edge of the upper blade (substantially parallel to the motion of its closure), the L-shaped hook is accordingly trapped and laid within the said capillary groove. After the scissors blades have been fully closed and immediately before they reopen, the air cylinder 208 throws its piston 206 from right to left, as shown in FIGS. 6 and 10, so as to rotatably depress the scissors S clockwise and drop the blades out of wiping contact with the L-shaped hook already formed. Now, when the scissors blades reopen, releasing the air piston 176, the upper blade does not wipe against the formed hook thereby enabling the hook to be maintained in accurate disposition within the groove 22. The groove 22 of the capillary tip C works against the L-shaped wire hook in making the first wedge bond, as illustrated in FIGS. 7, 8, 9 and 11.

Since damage to both the scissors S and the capillary C would occur if the capillary tip were lowered between the scissors blades in the time of closure thereof, an interlock switch 220 is provided to prevent actuation of the air cylinder 178 when the Z-lever 42 is depressed. The interlock switch 220 is mounted on the pedestal 48, as shown in FIG. 1, and is adapted to be engaged by an eccentric lobe 222 supported on the Z-lever 42. The lobe 222 is rotatably adjusted until the slightest hand depression of the Z-actuating lever 42 opens the contacts of the interlock switch 220.

Figure 11:
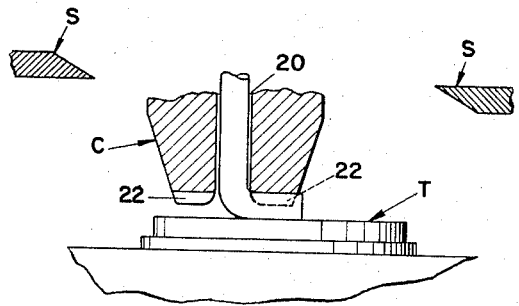
FIGURE 11 is an enlarged side elevational view of the capillary tool in bonding position.

With the capillary C threaded with wire W, and the various adjustments performed as hereinbefore described, the scissors S, is actuated by depressing a foot switch (not shown) or by manual depression of knob 175. Closure of the scissors blades effects the formation of the L-shaped wire hook under the capillary tip so that it is retained within the groove 22, as shown in FIGS. 7, 8, 9 and 10. When the blades are open, there is sufficient clearance to permit the capillary C to descend and pass freely therebetween as the bonding head B, is depressed. The chessman 32 and the Z-lever 42 are then manipulated to then press the capillary tip C with its captive L-shaped hook of wire thereunder directly over the bonding point on the transistor wafer, e.g. a stripe. When the Z-lever 42 is fully depressed against the stop 51, the capillary tip C bears against the wire constrained within the groove 22 and urges the wire into contact with the semiconductor T, as shown in FIG. 11. The transducer 14 will have pivoted through a small angle off from the stop 78X so that a predetermined loading force is applied. An actuating foot switch (not shown), for example, causes a 60 kilocycle input to be fed into the transducer 14 so as to cause its tapered tip 16 to be urged into longitudinal vibration. The time cycle for energizing the transducer 14 is accurately controlled at the module 12 for approximately 0.2 second for 1.5 mil aluminum wire.

Releasing the Z-lever 42 will permit the bonding tip C to be elevated upwardly through the scissors blades. The length of wire between the bonding tip and the end already bonded to the semiconductor wafer T is sufficient to permit this lead to be coupled to the post of the semiconductor without strain. The chessman manipulator 32 is now repositioned so as to orient the capillary C over the post of the semiconductor while lowering the capillary to form a mean loop from the first bond to the second bond at the post. The Z lever 42 is again depressed, and since the post is higher in elevation than the wafer itself, the transducer 14 will pivot through a greater angle until the anvil 84 engages against the roller 86 of the hammer 88. Accordingly, the hammer arm 88 will pivot off from the hanger 106 and apply a greater load on the bonding tip C, i.e., the additional force resulting from the counterweights 104. The transducer is again energized by actuation of its foot switch so as to transversely vibrate the capillary tip C. The Z-lever 42 is now raised to its upper limit whereby the stop 62X is in abutment with the bottom of the guideway 36, as shown in FIG. 1. The bottom of the capillary tip C is now immediately above the scissors blades preparatory to cut-off. Depression of the cut-off foot switch will now cycle the air cylinders 178 and 208 whereby the scissors blades will sever the wire, tuck the depending end of the wire as a hook under the capillary tip C preparatory to another bonding sequence. After the cylinders 178 and 208 have completed their cycle, the scissors will have again opened in preparation for a subsequent bonding sequence.

It is to be understood that the term "semiconductor" and/or "semi-conductive device," as used herein (and also those elements designated by the reference character T) is merely illustrative of the class of articles for which the principles of the instant invention are applicable. Such nomenclature is intended to embrace all those articles to which fine wire leads are secured and encompasses not only those articles fabricated from or utilizing semi-conductive materials (transistors, microcircuits, diodes, etc.) but also any device which requires external coupling by fine leads, including but not limited to ferroelectric elements, varistors, thermistors, crystals, printed circuits, and the like. Thus, the spirit of the hereindescribed ultrasonic bonding instrument contemplates the accurate positioning of the fine wire lead within the groove of a bonding tool, urging the tool with its constrained wire into controlled force engagement with a specific position on a surface of an element to which the lead is to be secured, and vibrating the wire at ultrasonic frequency generally parallel to the surface. It has been found that the bonding of wire by the instant invention can be accomplished in a small fraction (up to one-hundredth) of the time by any previous apparatus or method. Accordingly, the utilization of the described methods and means may be applied by those skilled in the art to a wide range of already fabricated and hereafter devised articles without departing from the spirit of the instant invention.

Although this invention has been described in considerable detail, such description is intended as being illustrative rather than limiting, since the invention may be variously embodied, and the scope of the invention is to be determined as claimed.

What is claimed is:

1. A bonding instrument for securing leads to semiconductive devices comprising a tool having a groove in a surface thereof which is adapted to be urged into juxtaposition with a semiconductive surface, means for dispensing wire along a line substantially normal to said tool surface adjacent to the groove thereof, cut-off means constituting a pair of shearing blades having an interfacial plane substantially normal to the axis of the dispensed wire and having shearing edges oriented normal to the axis of the groove when in wire cutting disposition, means for relatively moving said tool relative to said cut-off means, means to actuate closure of said cutting means when the grooved surface of said tool is immediately adjacent the opposing face of the nearest blade for severing the wire and accurately laying the depending end thereof within said groove and means to space said cut-off means away from said tool immediately before re-opening of the blades so that the wire will not be wiped out of the groove during opening of said cut-off means.

2. The invention of claim 1 wherein said groove is semicircular in cross-section having a diameter substantially equal to one wire diameter, a depth substantially equal to one-half the wire diameter, and a length between one to three wire diameters, including means for relatively moving said tool with respect to said semiconductive surface so that wire in said groove will be urged into contact with said semiconductive surface at a controlled predetermined force, and transducer means to impart high frequency vibrations to said tool whereby wire constrained within said groove will be bonded to the semiconductive surface.

3. A bonding instrument for securing leads to semiconductive devices comprising in combination a reciprocable tool having a groove in a surface thereof which is adapted to be urged into juxtaposition with the semiconductive device, means to feed wire to said groove along a line substantially normal to the surface thereof, cut-off means constituting shearing blades having an interfacial plane disposed substantially normal to the axis of the wire and having shearing edges oriented normal to the axis of the groove when in wire cutting disposition, means to move said tool relative to said cut-off means, means to actuate closure of said cut-off means when said tool surface is immediately adjacent the blades thereof so that the wire will be snipped and a depending portion thereof will be tucked within the groove by wiping action of the adjacent blade, means to space said cut-off means prior to opening of the blades so as to avoid reverse wiping of the wire already laid in the groove, means to urge said tool with wire in said groove into controlled force engagement with a surface on the semiconductive device only when the blades of said cut-off means are open, and transducer means to vibrate wire constrained between said groove and said semiconductive surface in a direction substantially parallel to said semiconductor surface.

4. A bonding instrument for securing leads to semiconductive devices comprising a capillary having a longitudinal bore therein and a groove at the tip thereof radially extending outwardly from the bore, dispensing means for feeding wire through the capillary bore, cut-off means for severing the wire extending through the capillary tip and tucking the severed end as a buttonhook accurately within said groove, and means to move said capillary relative to said cut-off means, means to effect closure of said cut-off means when the tip of said capillary is immediately adjacent thereto, and means to withdraw said cut-off means before re-opening thereof away from said capillary in order to prevent reverse wiping of wire tucked in the groove.

5. The invention of claim 4 including means for urging said capillary with wire constrained within the groove thereof into contact with a surface on the semiconductive device, and transducer means for vibrating said capillary at a high frequency so that wire in the groove will be rapidly bonded to the semiconductive device without elevating the temperature thereof.

6. A bonding instrument for securing leads to semiconductive devices comprising a reciprocable capillary having a longitudinal bore therein, a groove in the tip of said capillary radially extending outwardly from the bore, means for continuously dispensing wire through said capillary bore, scissors blades disposed immediately adjacent the capillary tip and having their cutting interfacial plane perpendicular to the wire while the direction of closure of the blades is substantially parallel to the radially extending groove, means to actuate the closure of said scissors blades whereby wire depending from the capillary tip will be severed and the severed end tucked as a buttonhook within said groove, and means to space the scissors blades a predetermined distance away from the capillary tip before opening of the blades, whereby reverse wiping by the blades against wire in the groove will be prevented as the blades re-open.

7. A bonding instrument for securing leads to semiconductive devices comprising a frame, a stage for supporting the semiconductors in said frame, a horizontally orientable, vertically reciprocable member in said frame, a longitudinally extending transducer pivotally supported about one horizontal axis in said member and normally oriented so that its longitudinal axis is horizontally transverse to the pivotal axis, a capillary mounted to the free end of said transducer and having a vertically disposed bore therein with a horizontal groove at the lower tip thereof radially extending outwardly from the bore, means to dispense wire through said capillary bore, and scissors means for severing wire depending from said capillary and tucking the severed end as an L-shaped hook within the groove.

8. The invention of claim 7 wherein said wire dispensing means includes a vertically disposed vertically reciprocable flexible tube into which the wire is threaded, a hypodermic needle longitudinally extending from the lower end of said tube and adapted to interfit within the bore of said capillary, and adjusting screw means to horizontally flex said tube so that the needle may be urged into registration with said capillary bore, and inserted therein for loading thereof.

9. The invention of claim 7 including means to apply a predetermined force against the wire constrained within said capillary groove as the capillary is depressed against the semiconductive surface so as to cause the transducer to pivot upwardly through a predetermined angle, and means to apply a second predetermined greater force upon said wire as said transducer is pivoted upwardly beyond said first-mentioned predetermined angle.

10. Lead bonding apparatus comprising a reciprocable capillary having lead wire dispensed therethrough, shearing means having blades disposed transverse to the axis of said capillary, means to reciprocate said capillary relative to said shearing means, means to close said shearing means when the tip of said capillary is disposed immediately adjacent the blades whereby closure of the blades will snip wire depending therebetween and then wipe the wire as an L-shaped hook about the tip, and means to space the closed blades of said shearing means away from the formed wire hook at the capillary tip prior to re-opening of the blades so as to prevent reverse wiping by the adjacent blade against the formed hook.

11. The invention of claim 10 including means to press said capillary with its formed wire hook into contact with a semiconductor device at a predetermined force normal to the surface of the device, and transducer means for imparting high frequency vibrations to the capillary in a direction parallel to the surface of the device.

12. The invention of claim 10 wherein said capillary includes a semicircular slot at the tip thereof radially extending from its bore and within which the L-shaped wire hook is laid, said semicircular slot having a diameter substantially equal to one wire diameter, a depth substantially equal to one-half the wire diameter, and a length between one to three wire diameters.

References Cited by the Examiner

UNITED STATES PATENTS

| | | | |
|---|---|---|---|
| 2,985,954 | 5/1961 | Jones et al. | 29—497.5 |
| 3,002,270 | 10/1961 | Prisco | 29—497.5 |
| 3,087,239 | 4/1963 | Clagett | 29—471.1 |
| 3,128,649 | 4/1964 | Avila et al. | 228—1 |

JOHN F. CAMPBELL, *Primary Examiner.*

M. L. FAIGUS, *Assistant Examiner.*